(No Model.) 2 Sheets—Sheet 1.

W. C. WHEELER.
MACHINE FOR SEPARATING DUST FROM AIR.

No. 324,440. Patented Aug. 18, 1885.

Witnesses:
Al. Stark
Willie O. Stark

Inventor:
Wm. C. Wheeler
by Michael J. Stark,
Attorney.

(No Model.) 2 Sheets—Sheet 2.

W. C. WHEELER.
MACHINE FOR SEPARATING DUST FROM AIR.

No. 324,440. Patented Aug. 18, 1885.

Witnesses:
A. Stark
Willie O. Stark

Inventor:
Wm. C. Wheeler,
by Michael J. Stark
Attorney.

United States Patent Office.

WILLIAM C. WHEELER, OF LOCKPORT, NEW YORK, ASSIGNOR OF ONE-HALF TO OLIVER C. WRIGHT, OF SAME PLACE.

MACHINE FOR SEPARATING DUST FROM AIR.

SPECIFICATION forming part of Letters Patent No. 324,440, dated August 18, 1885.

Application filed November 22, 1884. (No model.)

*To all whom it may concern:*

Be it known that I, WILLIAM C. WHEELER, of Lockport, in the county of Niagara and State of New York, have invented certain new and useful Improvements in Machines for Separating Dust from Air; and I do hereby declare that the following description of my said invention, taken in connection with the accompanying sheet of drawings, forms a full, clear, and exact specification, which will enable others skilled in the art to which it appertains to make and use the same.

My present invention has general reference to machines for separating dust from air; and it consists, essentially, in the novel details of construction, as hereinafter first fully described, and then pointed out in the claim.

Figure 1:
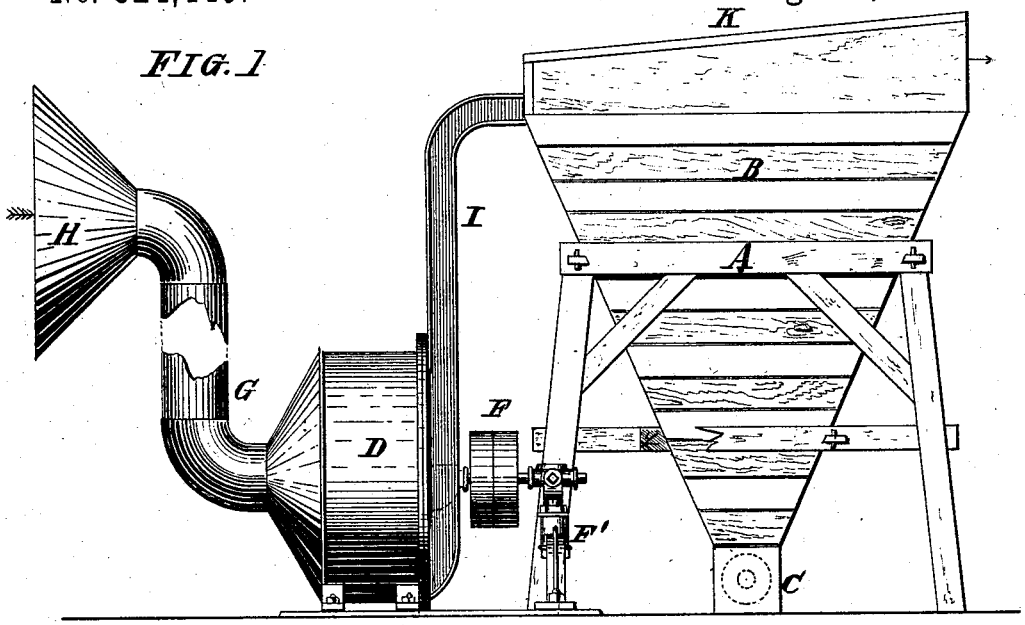
Figure 2:
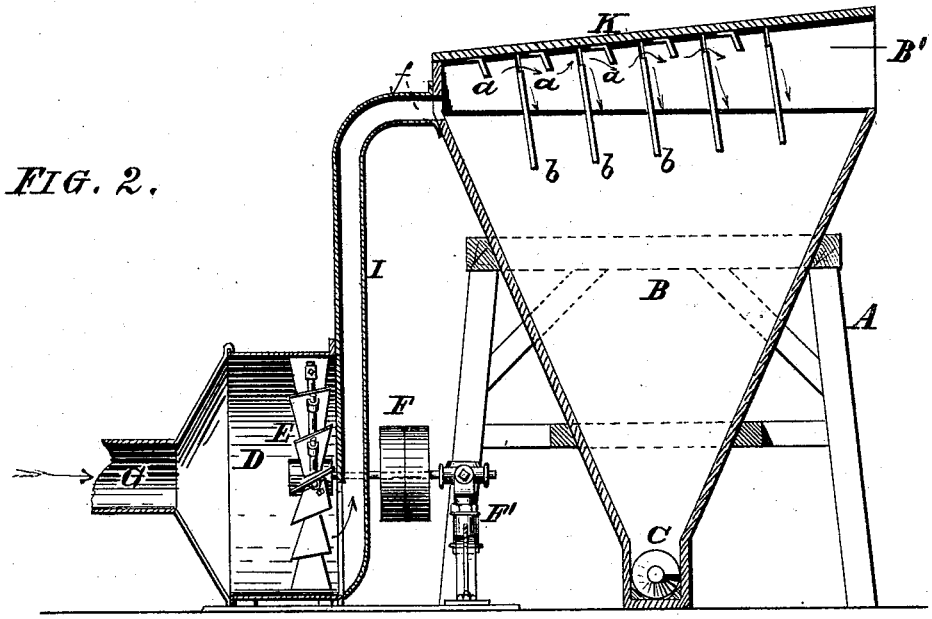
Figure 3:
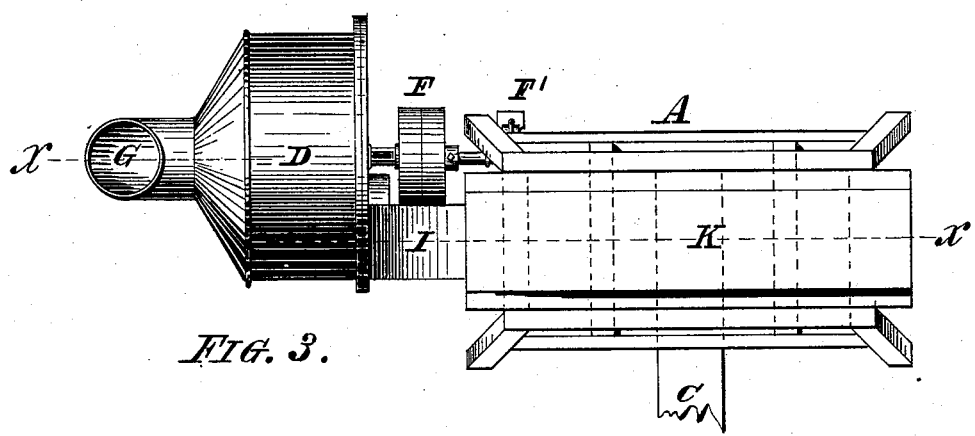
Figure 5:
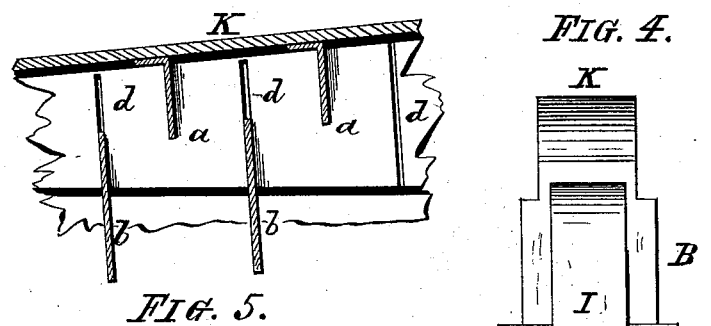
Figure 4:
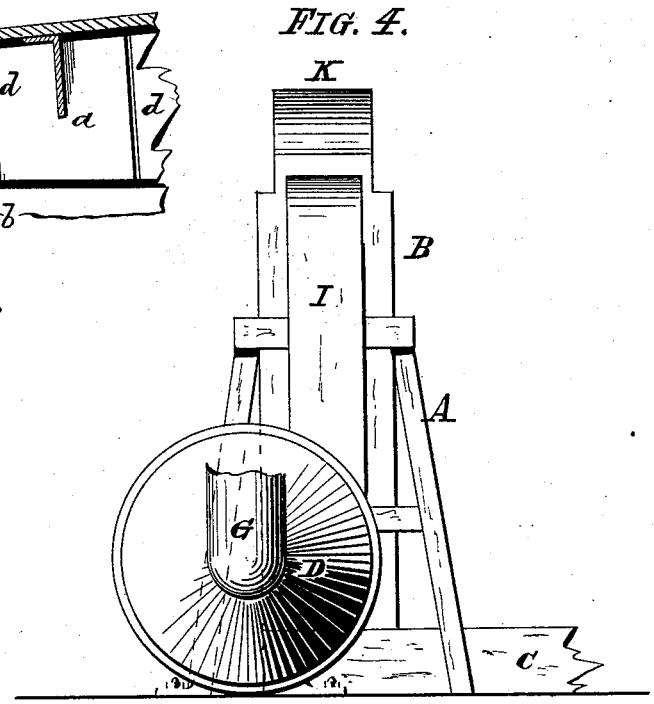

In the drawings already mentioned, which serve to illustrate my said invention more fully, Figure 1 is a side elevation of my improved dust-separator. Fig. 2 is a longitudinal sectional elevation in line $x\ x$ of Fig. 3. Fig. 3 is a plan, and Fig. 4 is an end view. Fig. 5 is a sectional elevation of the separator illustrating a portion of the partitions in the same on an increased scale.

Like parts are designated by corresponding letters of reference in all the figures.

The object of my present invention is the production of a simple and efficient dust collector and separator for middlings-purifiers, flour-mills, and other use for freeing the air from the dust or solid particles it contains. To attain this result I construct my dust-separator essentially of a peculiarly-constructed separating-chamber, B, suspended within or otherwise supported by any suitable and convenient frame or structure, A, substantially as shown in the drawings. The shape or contour of this chamber approximates in vertical side section to that of an inverted cone having two of its sides parallel and its lower end terminating in a conveyer, C, elevator, or other proper apparatus for removing the solid particles from the separator in any well-known manner. Into this separating-chamber B, I force a current of air loaded with the solid matter to be separated by means of a fan or other blowing-engine, D, having means for regulating the air-supply, such means consisting either in adjustable fan-blades E, in a throttle in the discharge-pipe I, or any other analogous devices for accomplishing the desired result.

In the upper portion of the separating-chamber B, I locate a series of slides, $b$, and slats $a$, said slides and slats forming obstructions to the current of air entering at $f$, so as to cause it to pass in a zigzag or undulatory passage through this chamber, and thereby to form eddies in the rear of the slides $b$, thus allowing the dust-particles to descend and to pass through the chamber B downward into the conveyer C, by which it is conveyed to any convenient place for storage or other obvious purposes. The slides $b$ are adjustably arranged within the chamber B—that is to say, in the walls of said chamber, at opposite sides, I form grooves $d$, Fig. 5, arranged obliquely, and into these grooves I place the slides $b$ already mentioned, so that the upper edges of said slides may be elevated or depressed, as the case may be, and thereby increase or lessen the obstruction to the incoming air-current. In the drawings I have shown five of these slides in conjunction with a like number of transverse slats, $a$. Any other number of these slides and slats may, however, be adopted, such number depending somewhat upon the desired capacity of the apparatus, the force of the air-blast, and the nature of the dust to be separated from the air, the presumption being that the lighter the solid particles and the stronger the air-blast the larger the number of obstructions to reduce the current of air to that speed that is best suited for the separation of the particles from the air will be necessary. The shape of the separating-chamber is somewhat essential to a successful apparatus for separating dust from the air, it being a fact that to cause a perfect separation the said chamber should be gradually increasing in size upwardly to reduce the speed of the air-current; or, which is equivalent to such increase in size of the chamber, the obstructions $a\ b$ should be so placed as to produce this result; or both the size of the chamber and the disposition of the obstructions should be so arranged as to accomplish the desired end.

To successfully operate this device, the suction-pipe G should be connected with the middlings purifier, smut-machine, roller-mill, wheat-separator, or any other machine generating dust, and the end of said pipe preferably formed into a funnel, H, so as to catch the air readily, and the fan E operated at such a speed that nothing but pure air free from dust will be discharged from the discharge end B' of the separating-chamber. If impure air still escapes, it indicates that the speed of the fan or its propelling capacity is too great, or that the obstructions $a\ b$ are not properly arranged relatively to each other, and that the slides $b$ should be elevated until pure air discharges at B'.

F represents a belt-pulley by which the fan is run from any suitable source of power, and F' represents a standard or bearing for the end of the pulley-shaft.

It is perfectly obvious that any fan having means for adjusting its suction or discharge may be used with this apparatus.

Having thus fully described my invention, I claim as new and desire to secure to me by Letters Patent of the United States—

The herein-described dust-separator, comprising a separating-chamber approximating in side elevation the shape of an inverted cone, and provided with alternate series of fixed slats and oblique adjustable slides located in its upper portion, a fan-blower, and the conveyer, substantially as described and for the purposes set forth.

In testimony that I claim the foregoing as my invention I have hereto set my hand in the presence of two subscribing witnesses.

WILLIAM C. WHEELER.

Attest:
O. C. WRIGHT,
S. C. LEWIS.